(12) United States Patent
Perl-Olshvang et al.

(10) Patent No.: US 11,135,537 B2
(45) Date of Patent: Oct. 5, 2021

(54) LONG LIFE AIR FILTER

(71) Applicant: enVerid Systems, Inc., Westwood, MA (US)

(72) Inventors: Sharon Perl-Olshvang, Pardes Hanna-Karkur (IL); Udi Meirav, Newton, MA (US); Shawn Brown, Wakefield, MA (US)

(73) Assignee: enVerid Systems, Inc., Westwood, MA (US)

( * ) Notice: Subject to any disclaimer, the term of this patent is extended or adjusted under 35 U.S.C. 154(b) by 0 days.

(21) Appl. No.: 16/480,145

(22) PCT Filed: Jan. 23, 2018

(86) PCT No.: PCT/US2018/014914
§ 371 (c)(1),
(2) Date: Jul. 23, 2019

(87) PCT Pub. No.: WO2018/136968
PCT Pub. Date: Jul. 26, 2018

(65) Prior Publication Data
US 2019/0381437 A1    Dec. 19, 2019

Related U.S. Application Data

(63) Continuation-in-part of application No. 15/489,539, filed on Apr. 17, 2017, now abandoned.
(Continued)

(51) Int. Cl.
*B01D 45/12* (2006.01)
*B01D 50/00* (2006.01)
(Continued)

(52) U.S. Cl.
CPC ............. *B01D 45/12* (2013.01); *B01D 45/16* (2013.01); *B01D 46/521* (2013.01);
(Continued)

(58) Field of Classification Search
CPC ...... B01D 50/002; B01D 45/16; B01D 46/10; B01D 46/0027; B01D 46/521;
(Continued)

(56) References Cited

U.S. PATENT DOCUMENTS 2,268,170 A * 12/1941 Schmidt ................... B04C 5/28
                                                      55/342.1
2,281,610 A *  5/1942 Watson .................... B04C 5/28
                                                      55/344
(Continued)

FOREIGN PATENT DOCUMENTS

CN    1788855 A    6/2006
CN    1795804 A    7/2006
(Continued)

OTHER PUBLICATIONS

Chinese Office Action dated Nov. 4, 2020, in Chinese Patent Application No. 201880011554.8, with English translation, 17 pages total.
(Continued)

*Primary Examiner* — Dung H Bui
(74) *Attorney, Agent, or Firm* — Cooley LLP

(57) ABSTRACT

An air filter comprising a housing, a plurality of cyclonic-element arrays and a plurality of individual airflow paths is disclosed herein. The housing includes a first side configured to be arranged or otherwise exposed to an upstream side of a first airflow, and a second side configured to be arranged or otherwise exposed to a downstream side of the first airflow. In some embodiments, the plurality of cyclonic-element arrays may be organized in a parallel or approximately parallel arrangement within and/or supported by the housing. Further, the plurality of individual airflow paths may correspond to the plurality individual of cyclone elements in each array life.

19 Claims, 11 Drawing Sheets

Related U.S. Application Data

(60) Provisional application No. 62/449,587, filed on Jan. 23, 2017.

(51) Int. Cl.
| | |
|---|---|
| *B01D 46/52* | (2006.01) |
| *B01D 45/16* | (2006.01) |
| *B04C 5/187* | (2006.01) |
| *B04C 3/00* | (2006.01) |
| *B01D 46/10* | (2006.01) |
| *B01D 46/00* | (2006.01) |
| *A47L 9/16* | (2006.01) |
| *B04C 5/28* | (2006.01) |
| *B04C 9/00* | (2006.01) |

(52) U.S. Cl.
CPC .......... *B01D 50/002* (2013.01); *A47L 9/1625* (2013.01); *A47L 9/1641* (2013.01); *B01D 46/0027* (2013.01); *B01D 46/10* (2013.01); *B04C 3/00* (2013.01); *B04C 5/187* (2013.01); *B04C 5/28* (2013.01); *B04C 9/00* (2013.01)

(58) Field of Classification Search
CPC .. B01D 45/12; B04C 3/00; B04C 5/28; B04C 9/00; A47L 9/1641; A47L 9/1625
See application file for complete search history.

(56) References Cited

U.S. PATENT DOCUMENTS

| | | | | |
|---|---|---|---|---|
| 2,734,630 A | * | 2/1956 | Van Der Wai | B04C 5/081 209/728 |
| 2,854,092 A | * | 9/1958 | Gustavsson | B04C 5/28 55/349 |
| 2,874,801 A | * | 2/1959 | Van Der Kolk | H01J 37/32935 55/348 |
| 3,074,219 A | * | 1/1963 | Phyl | B04C 5/28 55/348 |
| 3,261,467 A | * | 7/1966 | Wikdahl | B04C 5/28 209/728 |
| 3,350,852 A | * | 11/1967 | Schindling | B04C 5/28 55/348 |
| 3,747,306 A | * | 7/1973 | Wikdahl | B04C 5/28 55/349 |
| 3,915,679 A | | 10/1975 | Roach et al. | |
| 3,959,123 A | * | 5/1976 | Wikdahl | B04C 5/28 209/728 |
| 4,123,364 A | * | 10/1978 | Mozley | B04C 5/28 210/512.2 |
| 4,430,100 A | * | 2/1984 | Cardo | B01D 45/12 209/154 |
| 4,460,391 A | * | 7/1984 | Muller | B01D 45/12 55/343 |
| 4,539,105 A | * | 9/1985 | Metcalf | B04C 5/08 156/84 |
| 4,687,497 A | * | 8/1987 | Owen | C10G 11/182 55/349 |
| 4,702,846 A | * | 10/1987 | Ryynanen | B01D 45/12 209/722 |
| 5,403,367 A | * | 4/1995 | De Villiers | B01D 45/16 55/320 |
| 5,980,639 A | * | 11/1999 | Trickey | B04C 5/081 127/24 |
| 6,270,544 B1 | | 8/2001 | Mencher et al. | |
| 2003/0057151 A1 | * | 3/2003 | Kopec | B04C 3/04 210/512.2 |
| 2006/0130445 A1 | | 6/2006 | Park et al. | |
| 2006/0130449 A1 | | 6/2006 | Han et al. | |
| 2006/0168923 A1 | | 8/2006 | Lee et al. | |
| 2006/0230717 A1 | * | 10/2006 | Oh | B04C 5/24 55/343 |
| 2006/0230719 A1 | | 10/2006 | Han et al. | |
| 2007/0151453 A1 | | 7/2007 | Fukuma | |
| 2007/0234691 A1 | | 10/2007 | Han et al. | |
| 2008/0028940 A1 | | 2/2008 | Han et al. | |
| 2008/0148694 A1 | | 6/2008 | Smith | |
| 2009/0031680 A1 | * | 2/2009 | Hyun | B01D 45/16 55/345 |
| 2009/0036288 A1 | | 2/2009 | Hu et al. | |
| 2010/0224073 A1 | * | 9/2010 | Oh | A47L 9/1666 96/416 |
| 2010/0258008 A1 | * | 10/2010 | Cheng | B01D 45/16 96/190 |
| 2010/0267540 A1 | * | 10/2010 | Babb | B01D 45/16 494/59 |
| 2012/0036675 A1 | | 2/2012 | Conrad | |
| 2012/0132075 A1 | * | 5/2012 | Jarrier | B01D 46/003 95/268 |
| 2012/0209550 A1 | | 8/2012 | Van Der Spek et al. | |
| 2013/0220123 A1 | * | 8/2013 | England | C02F 3/22 95/271 |
| 2014/0305311 A1 | * | 10/2014 | Nakamura | B04C 5/28 96/228 |
| 2014/0373490 A1 | | 12/2014 | Wuebbeling et al. | |
| 2016/0332171 A1 | * | 11/2016 | Moons | B04C 5/04 |
| 2018/0207573 A1 | | 7/2018 | Perl-Olshavang et al. | |
| 2018/0207651 A1 | | 7/2018 | Meirav et al. | |
| 2020/0360847 A1 | | 11/2020 | Perl-Olshvang et al. | |

FOREIGN PATENT DOCUMENTS

| | | |
|---|---|---|
| CN | 103889584 A | 6/2014 |
| EP | 1063017 A2 | 12/2000 |
| EP | 1063017 A3 | 12/2000 |
| EP | 1671571 A1 | 6/2006 |
| GB | 999938 A | 7/1965 |
| KR | 2012/0048850 A | 5/2012 |
| WO | WO 2010/121991 A1 | 10/2010 |
| WO | WO 2015/112010 A1 | 7/2015 |
| WO | WO 2017/019628 A1 | 2/2017 |
| WO | WO 2019/018788 A1 | 1/2019 |
| WO | WO 2020/047437 A1 | 3/2020 |

OTHER PUBLICATIONS

Extended European Search Report for European Patent Application No. 18742362.9, dated Jul. 30, 2020, 9 pages.
International Search Report and Written Opinion for PCTUS2018/014914, dated May 2, 2018, 9 pages.
International Preliminary Report on Patentability for PCT/US2018/014914, dated Jul. 23, 2019, 7 pages.

\* cited by examiner

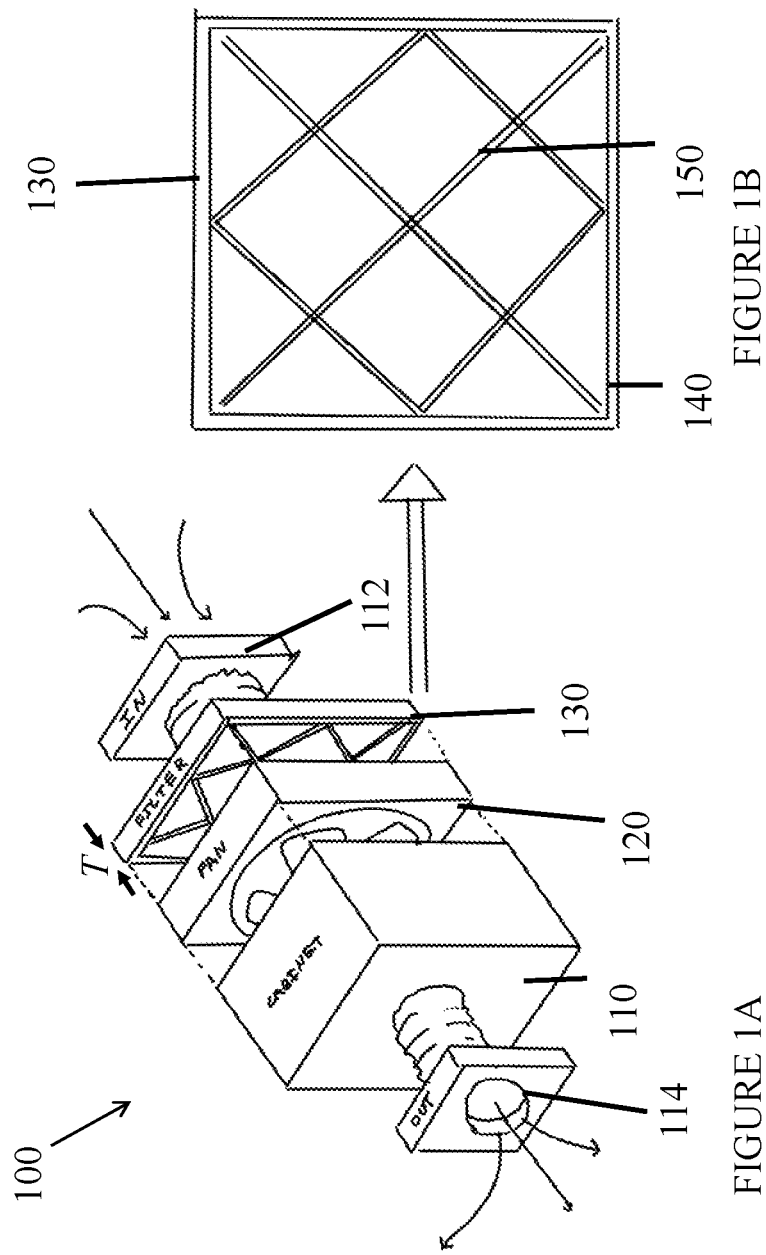

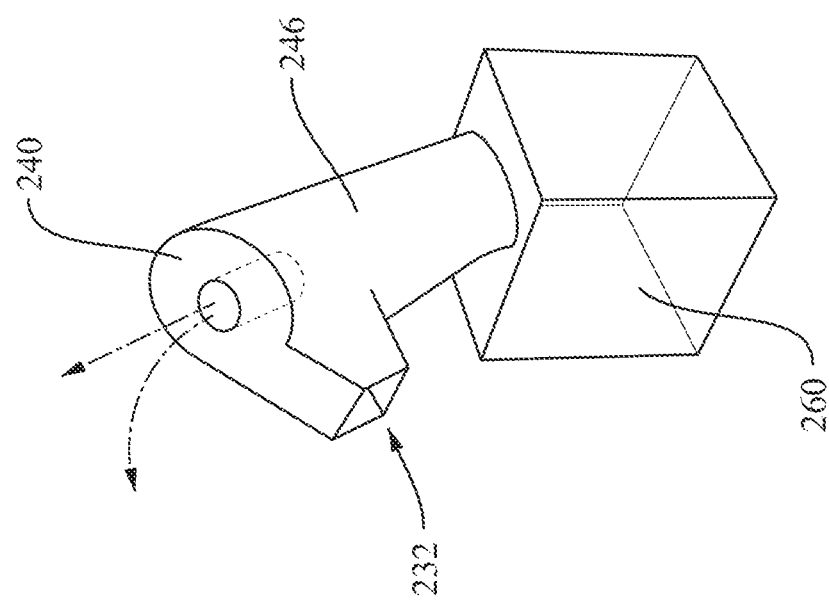
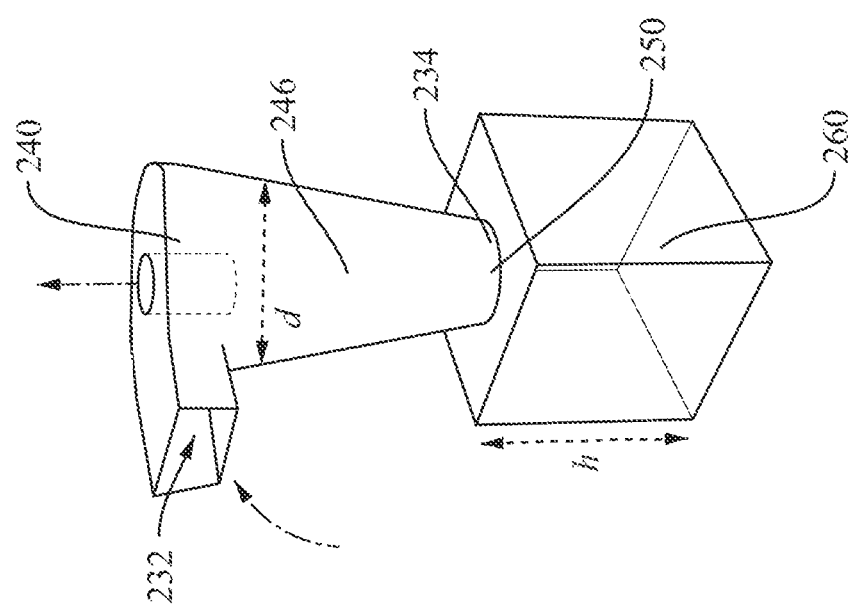
FIGURE 3A
FIGURE 3B

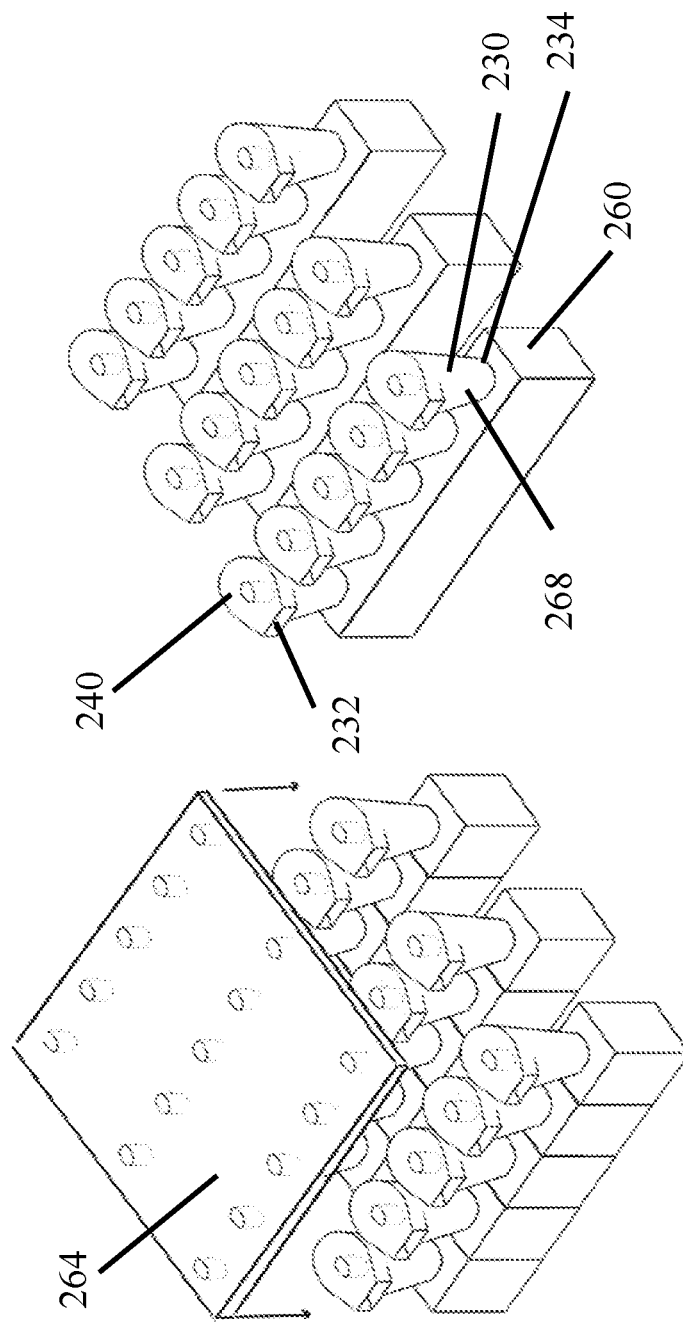

LONG LIFE AIR FILTER

CROSS REFERENCE TO RELATED APPLICATIONS

This application is a 35 U.S.C. § 371 national stage entry of PCT International Application No.: PCT/US2018/014914, filed Jan. 23, 2018, entitled "Long Life Air Filter" which is a continuation-in-part of and claims priority to U.S. patent application Ser. No.: 15/489,539, filed Apr. 17, 2017, entitled "Long Life Filter", and also claims priority to U.S. Provisional Patent Application No. 62/449,587, filed Jan. 23, 2017, entitled "Long Life Air Filter Based on Microfluidic Plastic Media". This application is also related to (and for U.S. purposes only, further claims priority to) PCT International Application No. PCT/US2016/043922, filed Jul. 25, 2016, entitled "Apparatus, Methods and Systems for Separating Particles from Air and Fluids" ("the '922 PCT").

TECHNICAL FIELD

Embodiments of the present disclosure generally relate to apparatus, systems and methods for air filtration in ventilation and cooling systems, and in particular to replaceable air filters that are embedded in filtration systems.

BACKGROUND

Most ventilation systems include air filters, whose primary role is to capture suspended particles and prevent them from proceeding with the air stream. There is a large variety of filter types and brands, but they all operate on a similar principle where a permeable medium allows air to flow through, while particulate matter that is suspended in the air is captured within the medium. Many of these media are based on woven or non-woven fibers of various types and densities. Over the operating life of the filter, particulate matter accumulates in the medium, gradually degrading its permeability. Such filters typically require frequent replacement which leads to recurring expenses of purchasing replacement filters, disposing the old filters and the time and effort associated with the frequent replacement. Furthermore, the filters' performance may deteriorate as captured particulate matter builds up in the media.

Media filters are frequently configured as standard, easy-to-replace parts that are shaped and sized to fit the ventilation system into which they are inserted, or vice versa, ventilation systems are designed to accept a standard filter from among a group of widely accepted standard filter sizes. In particular, many filters are standardized to certain rectangular dimensions and thicknesses, allowing the operator to acquire replacement filters from any number of different manufacturers who produce such replacement filters to established dimensions and specifications.

Cyclonic separators have the capacity to remove and capture solid particles from an air stream, using a different mechanism than media filters. A cyclonic separator may be comprised primarily of, a cyclonic cavity, typically a hollow cylinder or cone or a similar shape with cylindrical symmetry around a vertical axis. Air enters the cavity at a high velocity through a tangential inlet and in an orientation that is horizontal, namely in a plane that is perpendicular relative to the vertical axis of the cavity. The air stream forms a vortex and the resultant centrifugal forces push suspended particles towards the wall of the cavity. Air exits the cavity through a central axial outlet, and the particulate matter is collected at the bottom of the cavity. Cyclonic separators have the advantage of being able to separate and capture much larger quantities of solid particles without becoming clogged. However, in their conventional form, cyclones are not suitable as a filter alternative in ventilation systems for functional reasons as well as for reasons of form, shape and size.

SUMMARY OF THE DISCLOSURE

In some embodiments, an air filter comprising a housing, a plurality of cyclonic-element arrays and a plurality of individual airflow paths is disclosed. The housing includes a first side configured to be arranged or otherwise exposed to an upstream side of a first airflow, and a second side configured to be arranged or otherwise exposed to a downstream side of the first airflow. In some embodiments, the plurality of cyclonic-element arrays may be organized in a parallel or approximately parallel arrangement within and/or supported by the housing. Further, the plurality of individual airflow paths may correspond to the plurality individual of cyclone elements in each array.

In some embodiments, each array may comprise a plurality of cyclonic-elements, and each cyclonic element may comprise a cylindrically-symmetric or conically-symmetric cavity having a tangential airflow inlet and an axial airflow outlet. In some embodiments, the cyclonic elements in each array may be attached to each other and/or to a first sheet of material to form a common surface that: includes and/or is in airflow communication with the airflow outlets of the cyclonic elements of the array, and is in airflow communication with the second side of the housing. In some embodiments, each airflow path may correspond to a respective cyclone element and may comprise the path established from a respective airflow inlet, through a respective cavity, and to a respective airflow outlet. In some embodiments, the first airflow entering the housing via the first side flows through the plurality of cyclone elements of each array via the plurality of corresponding airflow paths, and is expelled via the second side of the housing.

In some embodiments, the cyclonic elements are configured to remove at least a portion of particles suspended in air flowing through the cyclonic elements. In some embodiments, the plurality of arrays are further configured with a plurality of receptacles configured to receive and retain particles separated from air flowing through the cyclonic elements. In some embodiments, the depth h of each receptacle is between about 2 mm to about 50 mm, between about 3 mm to about 50 mm, between about 3 mm to about 30 mm, between about 3 mm to about 20 mm, including subranges and values therebetween.

In some embodiments, the housing can be substantially rectangular. Further, the filter may include a thickness T between about 10 mm to about 200 mm, about 20 mm to about 180 mm, about 40 mm to about 160 mm, about 60 mm to about 120 mm, about 80 mm to about 100 mm, including subranges and values therebetween. In addition, in some embodiments, the inner diameter d of the cavity can be less than about 10 mm, about 8 mm, about 5 mm, about 3 mm, about 2 mm, including subranges and values therebetween. In some embodiments, the inner diameter d of the cavity at its widest point can be less than about 10 mm, about 8 mm, about 5 mm, about 3 mm, about 2 mm, including subranges and values therebetween.

In some embodiments, the filter disclosed herein may comprise a plurality of parallel or approximately parallel planar segments each oriented perpendicular or approximately perpendicular to a plane of the filter. In some embodiments, the plurality of parallel or approximately parallel planar segments may be each oriented at an angle greater than about 15 degrees, about 20 degrees, about 25 degrees, about 30 degrees, about 35 degrees, about 40 degrees, about 45 degrees, including subranges and values therebetween, relative to a plane of the filter. In some embodiments, the arrays can be configured in a plurality of layers, and each layer may be configured as an integral plastic monolith.

In some embodiments, each array of the disclosed filter may be arranged perpendicular or approximately perpendicular to the first side; and the plurality of the arrays may be arranged parallel or approximately parallel to each other such that when the first side of the housing is arranged in a vertical position, the plurality of arrays are horizontal or approximately horizontal. In some embodiments, the filter further comprises connecting material configured to guide and/or constrain the first airflow through the plurality of individual airflow paths of the cyclonic elements, wherein the connecting material comprises one or more second sheets of material. In some embodiments, the filter includes no other airflow pathways other than the cyclonic elements. In some embodiments, the housing is configured as a wall of a cylindrical-tube, such that the first side comprises the outside surface of the wall, and the second side comprises the inside surface of the wall, and the first airflow traverses from the first side to the second side of the housing radially.

In some embodiments, a method for increasing a lifespan or a replacement cycle time of an air filtration system having a plurality of filters is disclosed. The method comprises replacing an original or an existing filter with replacement filter according to the filter disclosed herein, or by arranging additional filters according to the filter disclosed herein adjacent to or upstream of a plurality of the existing filters of the air filtration system. In some embodiments, such a method may facilitate an increase in the lifespan or a replacement cycle time of an air filtration system.

BRIEF DESCRIPTION OF THE DRAWINGS

The principles and operations of the systems, apparatuses and methods according to some embodiments of the present disclosure may be better understood with reference to the drawings, and the following description. These drawings are given for illustrative purposes only and are not meant to be limiting.

FIGS. 1A and B are a schematic ventilation system and a removal filter (FIG. 1A) and a single filter (FIG. 1B), constructed and operative according to some embodiments of the present disclosure;

FIGS. 3A and 3B are each an exemplary individual cyclonic element of the array, configured with a receptacle for separated particles, constructed and operative according to some embodiments of the present disclosure;

FIGS. 4A and 4B are a single receptacle shared by multiple cyclonic elements in the array and enclosed by a frame (FIG. 4A) and shown without the frame (FIG. 4B), constructed and operative according to some embodiments of the present disclosure;

FIG. 8A shows a stack where the arrays are at a 90-degree angle to the filter.

FIG. 8B shows a stack where the arrays are at a 45-degree angle to the filter, constructed and operative according to some embodiments of the present disclosure.

DETAILED DESCRIPTION

Figures 2A, 2B:
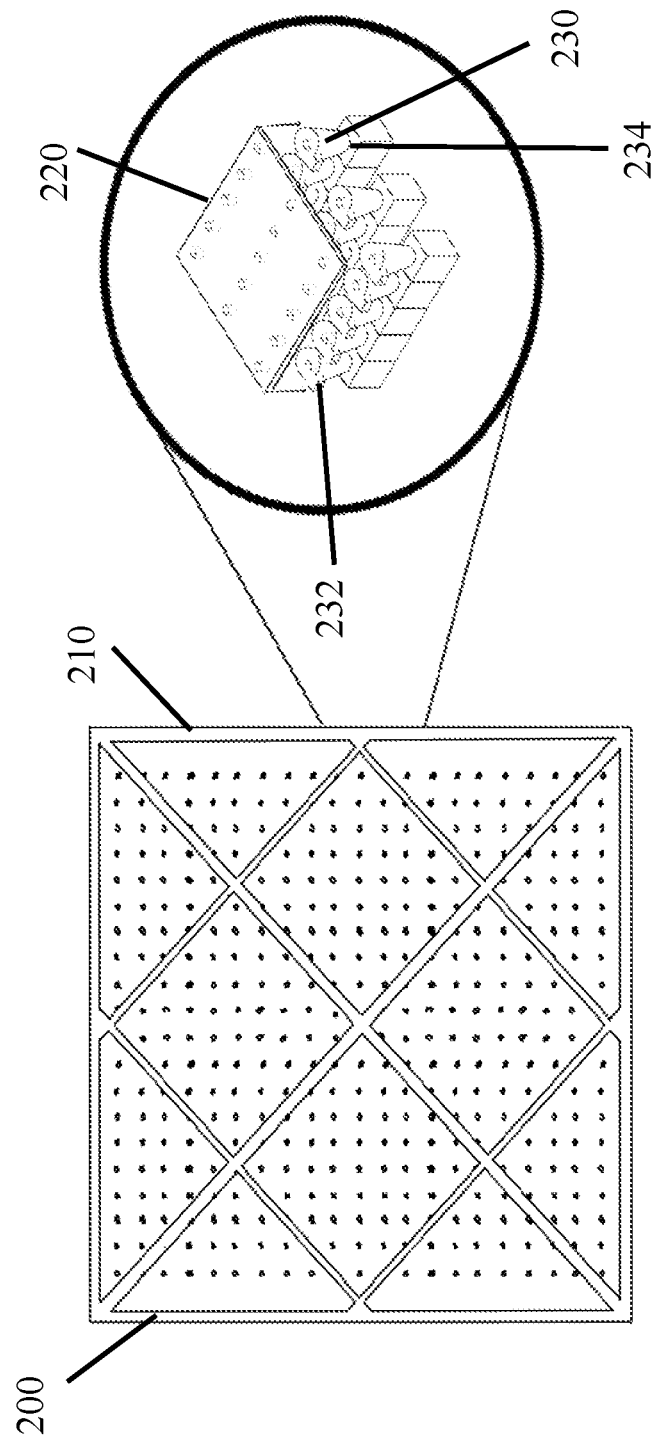
FIGS. 2A and 2B are a schematic filter (FIG. 2A) comprising a monolithic array of miniature cyclonic elements (FIG. 2B), constructed and operative according to some embodiments of the present disclosure.

There is thus provided according to some embodiments of the present disclosure an air filter comprising a housing (which may include a frame or a boundary), and a plurality of arrays of cyclonic elements organized in a substantially parallel arrangement and supported or contained by the housing, wherein each cyclonic element comprises a hollow cylindrically-symmetric cavity with a tangential inlet and an axial outlet. In some embodiments, the cyclonic elements in each array may be attached to each other so as to form a surface, or are attached to a common impermeable surface configured to enable air flow from one side of the surface to the other only by entering the inlets and passing through the cyclonic cavities and exiting the axial outlets to the other side of the surface.

There is thus provided according to some embodiments of the present disclosure an air filter comprising a geometric surface through which air enters the filter and a plurality of monolithic arrays of parallel cyclonic elements. In some embodiments, each cyclonic element comprises a hollow cylindrically-symmetric cavity with a tangential inlet and an axial outlet. In some embodiments, each array is oriented substantially perpendicular to the filter surface and the plurality of arrays are substantially parallel to each other, wherein when the filter surface is in a vertical orientation, the arrays are substantially horizontal, and wherein impermeable barriers or sheets of material are configured to guide and constrain the air flowing through the filter such that substantially all incoming air can only pass through the filter by flowing through the tangential inlets, into the cavities and through the axial outlets of the cyclonic elements.

There is thus provided according to some embodiments of the present disclosure an air filter comprising a plurality of arrays of parallel cyclonic elements supported or contained by the housing (which may include a frame or a boundary), wherein each cyclonic element comprises a hollow cylindrically-symmetric cavity with a tangential inlet and an axial outlet, wherein the cyclonic elements in each array are attached to their neighbors to form a surface or are attached to a common impermeable surface such that air can flow from one side of the surface to the other by entering the inlets and passing through the cyclonic cavities and exiting the axial outlets to the other side of the surface, and where there are no other pathways across the array surface other than through the cyclonic elements.

In some embodiments, the housing (e.g., frame) forms a cylindrical filter configured for air flow that traverses the cylinder radially.

As media filters are frequently configured as standard, easy-to-replace parts that are shaped and sized to fit the ventilation system into which they are inserted, or vice versa, ventilation systems are designed to accept a standard filter from among a group of widely accepted standard filter sizes. Thus, if novel filtration media become available, they can be used in some existing ventilation systems even if these systems were not originally designed to utilize these media, as long as the new media can be formed into standard-sized replacement filters.

FIG. 1A shows a schematic of a ventilation system 100, which may comprise a cabinet 110, a fan 120, an inlet 112, and outlet 114, and a filter 130. The system 100 may comprise a plurality of fans and a plurality of filters, and the filters can be positioned, with respect to the direction of airflow, before (upstream of) the fan 120 or after (downstream of) the fan 120. Other components can be configured in the systems, such as electric heaters, refrigerant coils, (not shown), etc. The filter 130 is shown separately in FIG. 1B and is shaped as a rectangular sheet, typically with a distinct frame 140 or a boundary. In some embodiments, the filter may comprise a housing (which may include the frame or boundary). The frame 140 or housing can support a layer of filtration medium, such as but not limited to non-woven fiber and/or air-permeable paper or cloth.

The filter frame 140 or housing defines a first geometric surface through which air enters the filter 130, and a second surface through which air exits the filter 130. In some embodiments, these two surfaces are at least substantially parallel, often planar. In some embodiments, the filters 130 may be formed as a non-planar filter.

In some filters 130, a permeable sheet of paper may be pleated in an accordion-like fashion to increase the amount of surface. The filtration performance of the filters can be controlled by varying properties of the permeable sheet such as the pleating density, the paper type, etc., of the permeable sheet. The frame 140 or housing can be formed of cardboard, plastic, metal, rubber, and/or any other suitable material. The frame 140 or housing can support the medium along the edge. Further support may be provided by cross beams 150 or a rigid screen placed within the medium. These serve to keep the media in place and support and maintain the form and shape of the media in the filter 130. Other filter shapes may be utilized, including non-rectangular flat shapes, such as a circular disc, or a non-flat shape such as hollow cylindrical filters which allow air to flow axially into the cylindrical space and radially through the medium.

In some embodiments, the filter frame 140 or housing is supported by the cabinet 110, and held in a location and orientation such that the air flows through the filter 130 urged by the fan 120. The filter 130 and the cabinet 110 may be further configured so that the filter 130 can easily be removed and replaced by a similar, new filter 130 as needed. In one non-limiting example, a slot is configured in the cabinet 110 allowing the filters 130 to slide in and out on guides or rails that match the filter 130. In some embodiments a hinged or removable lid or cover is configured to be opened and to allow filters 130 to be removed and replaced.

FIG. 2A shows another example filter embodiment comprising a monolithic planar array 220 of very small cyclonic cavity elements 230 attached to each other. The filter 200 is shown in FIG. 2A to have rectangular shape as an example embodiment, but can have any shape including irregular or regular (e.g., circular, square, etc.) shapes. FIG. 2B shows an expanded close up view of a section of the array 220. Each cyclonic element further comprises a tangential inlet 232 and a concentric outlet 234, such that some or all the inlets 232 are in fluid communication with one side of the array and some or all the outlets 234 are in fluid communication with the other side of the array 220.

In some embodiments, a thickness of the filter (defined, for example, as the average separation distance between the two opposite planar surfaces of the filter (e.g., T in FIG. 1A)) can be in the range from about 10 mm to about 200 mm, from about 15 mm to about 180 mm, from about 20 mm to about 160 mm, from about 40 mm to about 140 mm, from about 60 mm to about 120 mm, about 80 mm to about 100 mm, including values and subranges therebetween.

FIGS. 3A and 3B show schematic illustrations of embodiments of a single cyclonic element 240 of the array 220 (FIG. 2B). Each element 240 in the array 220 may comprise walls that are substantially symmetric about an axis and define a hollow cavity 246 having the shape of a cylinder, a cone or a hybrid structure. For example, the hollow cavity 246 may have a conical shape with a changing diameter d along the axis of the cavity 246. In some embodiments, the cyclonic elements 240 may have one or more additional openings for the expulsion of solid particles.

In some embodiments, receptacles are configured to receive expelled particles from the cyclone element 240. For example, as shown in FIG. 3A, a particle outlet 250 can be located around the bottom tip of the cavity 246 and a receptacle or compartment 260 can be attached therein.

In some embodiments the receptacle 260 may be positioned at an angle relative to the cylindrical axis of the cavity 246 (FIG. 3B), i.e., the axis of the hollow cavity 246 may not align with a major axis of the receptacle 260. The receptacle 260 may have any shape provided the receptacle is sized and shaped to receive particles expelled from the cavity of a cyclonic element 240. For example, the receptacle 260 may be a box with a depth h ranging from about 2 mm to about 50 mm, from about 3 mm to about 35 mm, from about 5 mm to about 20 mm, from about 6 mm to about 10 mm, including values and subranges therebetween.

In some embodiments, such as shown in FIGS. 3A and 3B, a separate receptacle is attached to each cyclonic element 240. In some embodiments, shown in FIG. 4B, a single receptacle 260 can be shared by a plurality of cyclonic elements 240. In some embodiments, an array of cyclonic elements 240 may include a combination of cyclonic elements each attached to a single receptacle and a plurality of cyclonic elements sharing a single receptacle.

In some embodiments, the arrays are configured in one or more layers, each layer comprising a plastic monolith.

For example, FIGS. 4A and 4B show example embodiments of filters with cyclonic arrays that are configured to prevent passage of gas or air through the filters except via paths that traverse from the tangential inlets 232, through the hollow cyclones to exit out the concentric axial outlets 234. Such embodiments may be obtained by, for example, densely-packing cyclonic elements 240 into a monolith such that little or no gaps exist between the cyclonic elements to allow air or gas to seep in between the cyclonic elements 240 (FIG. 4B). As another example, the cyclonic elements 240 can be attached to a common sheet or surface 264 (FIG. 4A) that holds the elements in their place and prevents air from flowing through the array except via the path from the tangential inlets 232 to the axial outlets 234. The sheet 264 may have topographical features and may not be entirely flat but generally the only air passages through the sheet are the outlets 234 of the elements 240. The surface 264 may comprise any surface and in some embodiments may comprise a common impermeable surface. The monolithic array of miniature cyclones addresses several issues that have prevented cyclonic separation from being implemented in ventilation systems. First, the physical conformity to the design of most ventilation systems, requiring generally thin and flat filter sheets, often rectangular, with air flowing through the flat planar sheet, and an ability to conform to the dimension required by the cabinet or the fan.

In some embodiments, the dense-packing of cyclonic elements 240 into a filter that can be used in custom or existing air treatment systems may be facilitated by the miniature size of the cyclonic elements 240. For example, the overall height of the entire cyclonic element 240 can range from about 0.5 mm to about 25 cm, from about 1 mm to about 20 cm, from about 50 mm to about 15 cm, from about 500 mm to about 15 cm, from about 1 cm to about 10 cm, from about 5 cm to about 10 cm, including values and subranges in between. Such small sizes may allow for packing a large number of cyclonic elements into a portable filter that has a small footprint, facilitating the use of such filters in standard air cleaning systems. In some embodiments, the cyclonic elements 240 may be sized based on the size of the particles that are slated for removal from the airstream. For example, larger cyclonic separators can generally be ineffective at separating fine particles, as the centrifugal forces in most cyclones may be insufficient to effectively sequester very fine or light particles. A larger centrifugal force to separate out even finer particles from an airstream may be attained by reducing the size of the each cyclonic element in the filter while maintaining a substantially constant linear velocity for the airstream (since the centrifugal force is inversely proportional to the radius of curvature of the circular motion). Thus, in some embodiments, a large number of small cyclones may carry a comparable air stream as one larger cyclone, while producing much higher separation forces and thus provide far superior filtration of fine particles, in some embodiments. With the cyclonic elements, and filters containing such elements, as disclosed herein, in some embodiments, particles with size (e.g., average radius) the micron range (e.g., from about 0.01 micron to about 0.1 micron, from about 0.1 micron to about 1 micron, from about 1 micron to about 10 microns, exceeding 10 microns, including values and subranges therebetween, may be separated out from an airstream.

In some embodiments, the linear velocity of the airstream may be controlled using a fan 120 or a pressure differential, similar to that shown in FIG. 1A. Under such pressure, the airstream can be forced to traverse the array by flowing through the inlets 232 of the cyclonic elements 240. As air enters the tangential inlet 232 of any single cyclonic element, its momentum causes it to circulate and form a vortex. Air exits the cavity 230 out through the concentric outlet 234, which may be further configured with a tube that extends along the axis into the cavity 230. However, the circulation creates a centrifugal force large enough to push suspended particles in the airstream to the outer wall 268 of the cyclonic cavity, leading to the separation and collection of the suspended particles into a receptacle 260. By controlling the linear velocity of the airstream (via a pressure differential, for example) and the size of the cyclonic elements (e.g., by reducing radius of the conical cavity of the cyclonic element), in some embodiments, the separation and collection of particles (including finer particles) from an airstream may be efficiently accomplished.

The cyclone element 240 cleans the air stream while the separated particles accumulate in the receptacle. As long as the receptacle is not full, the cyclone element 240 can continue to function effectively in separating particles from the incoming air stream. An extended operating lifetime is enabled by having sufficiently large receptacles 260, which would take a long time to fill. While the horizontal cross section, or footprint, of each receptacle 260 is limited by the neighboring cyclones and their respective receptacles 260, the vertical dimension, or depth, of the particle receptacles 260 can be made as large as necessary thereby increasing their volume and extending the usable service life of the filter as much as needed. Further, in some embodiments, a plurality of the receptacles may be configured as a combined unit that may be removable separate from the cyclonic cavities.

Figure 5B:
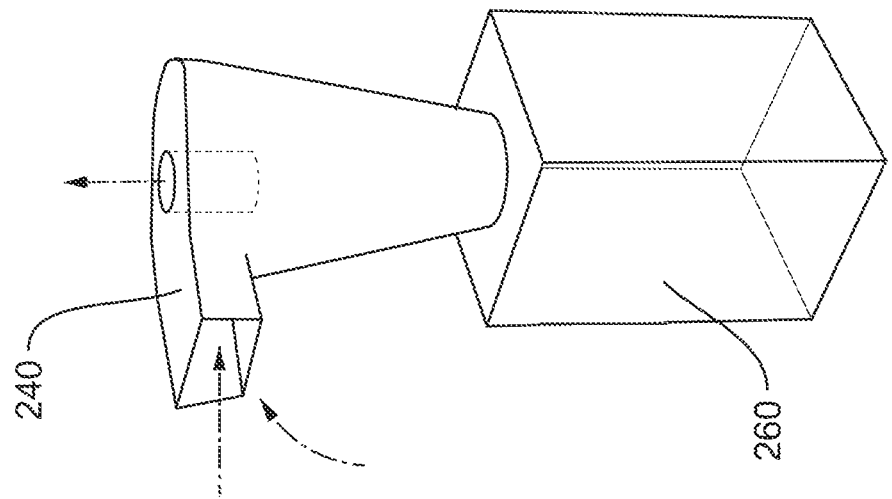
FIGS. 5A and 5B are two different receptacle depths for otherwise-similar cyclonic elements, constructed and operative according to some embodiments of the present disclosure.
Figure 5A:
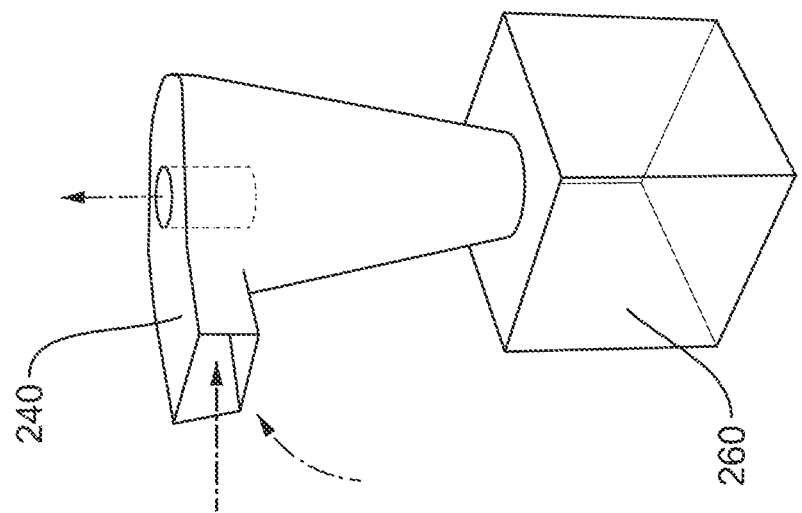

FIGS. 5A and 5B show a schematic illustration of two similar cyclone elements with similar receptacle footprints but different receptacle depths. The element on the right (5B) has a receptacle 260 that is approximately twice the depth and volume of the one on the left (5A), as a result, a filter configured with an array based on the cyclone element of FIG. 5B will have approximately twice the useful operating life.

In the following non-limiting example, the filtration of outside air with relatively high pollution levels is described. Particulate matter (PM) is typically measured in micrograms per cubic meter (ug/m$^3$) or nanograms per liter (ng/liter), which are the same units. An outdoor PM level of 100 is considered high but not unusual in some of the world's more polluted cities. In one embodiment of the cyclonic filter array, each cyclone has a footprint of about 10 mm$^2$ and under the intended operating conditions of static pressure of 0.25" Water Gauge (WG) induced by a fan, it carries approximately 0.1 liters per minute. If the cyclone elements separate virtually all the PM and eject them to the receptacle, the rate of mass accumulation in the receptacle, $R_m$, would be:

$$R_m = 0.1 \text{ liter/min} \times 100 \text{ ng/liter} = 10 \text{ ng/min} = 600 \text{ ng/hour}$$

In the maximum workload example of 24 hours, 365 days a year, namely 8,760 hours per year, the annual rate of mass accumulation in each receptacle is:

$$R_m = 600 \text{ ng/hour} \times 8760 \text{ hours/year} = 5.3 \text{ milligrams/year}$$

So in this example and under these conditions, for a 10 year operating life the particle receptacle has to have the capacity for 53 milligrams. The volume of this accumulation would depend on the density of the particles, but for particles that are approximately the density of water, 1 mg/mm$^3$, that would imply about 50 mm$^3$ volume. The dust receptacle for a single cyclone has a footprint approximately matched to the cyclone element, 10 mm$^2$, so it would need to be approximately 5 mm deep to provide for a 10 year lifetime. In a further embodiment of this example, a heating, ventilation air-conditioning (HVAC) replaceable filter would have a surface area in the range from about 30-90 cm square, about 40-80 cm square, about 50-70 cm square, about 60 cm square, including values and subranges therebetween, and a thickness that is in the range of from about 10 mm to about 50 mm, from about 15 mm to about 40 mm, from about 20 mm to about 30 mm, about 25 mm, including values and subranges therebetween. The cyclonic cavity elements would be between about 5 mm to about 15 mm, between about 7 mm to about 13 mm, between about 9 mm to about 11 mm, about 10 mm, including values and subranges therebetween, in height excluding the receptacle. A receptacle of between 10 20 mm can be attached while still maintaining a target thickness of under about 25 mm, under about 20 mm, under about 15 mm, including values and subranges therebetween for the cyclone array sheet. This example can be utilized to calculate the required bin depth for other operating conditions and required lifetimes.

More generally, the depth of the receptacles can be made larger to accommodate more particle volume, or smaller to produce a thinner or lighter filter. In some embodiments, the receptacle depth can be between about 1 mm to about 100 mm, between about 1 mm to about 75 mm, between about 1 mm to about 50 mm, between about 2 mm to about 50 mm, between about 2 mm to about 30 mm, between about 3 mm to about 20 mm, between about 5 mm to about 18 mm, between about 7 mm to about 16 mm, between about 9 mm to about 14 mm, including values and subranges therebetween.

The filter may comprise more than one monolithic array. In some embodiments, a plurality of monolithic arrays can be combined into segments, to form a filter of the required form and dimensions. Multiple array segments can be attached in a number of configurations and using a number of techniques.

Figure 6:
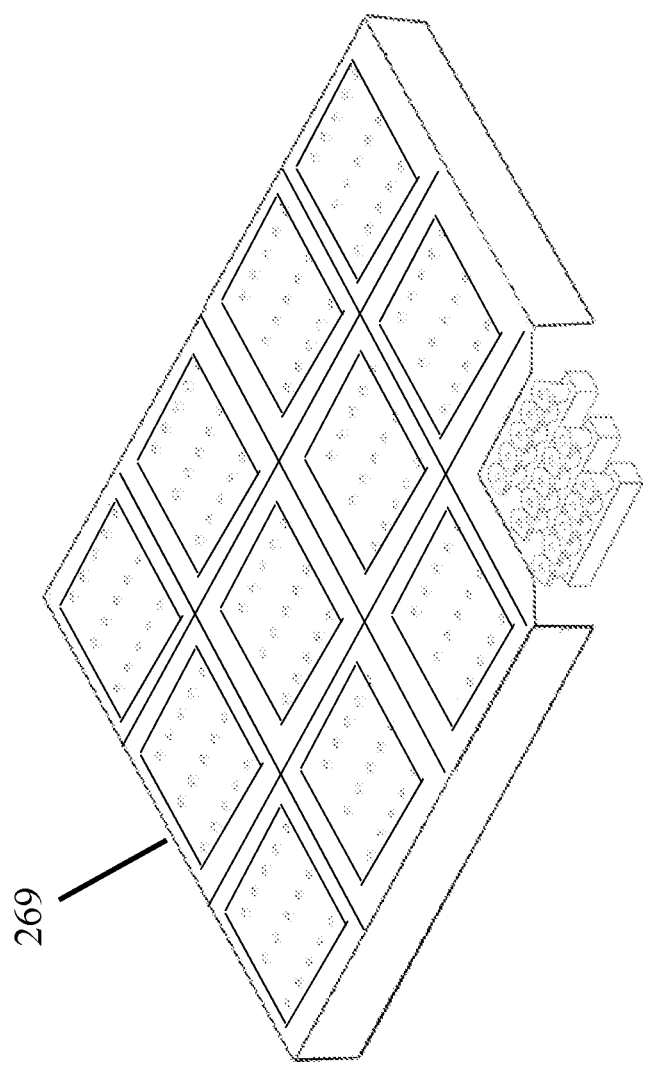
FIG. 6 is a schematic multiple array segment combined to form a single coplanar filter by attachment to a common frame, constructed and operative according to some embodiments of the present disclosure.

The multiple arrays can be combined in a co-planar configuration, to form a larger, single planar filter. This approach allows one manufactured array module to be used to form a variety of different sizes of a planar filter. The arrays can be attached using any suitable technique, including but not limited to adhesives, clips, direct mechanical attachment or welding. The individual arrays may be attached to a common frame 269, as shown in FIG. 6, or directly attached to each other. In some embodiments, the individual arrays maybe attached removably or irremovably to the common frame or each other.

Alternatively, multiple array segments can be combined in a non-coplanar configuration. For example, segments can be parallel to each other but not in the same plane. Such configuration can be seen as analogous to pleating of ordinary paper filters, where each array segment is analogous to a single pleat, as described herein.

The orientation of the filter may depend on the system in which it is placed. In general the air flows at the surface of the array in a direction that is perpendicular to the array's geometric surface. In some filtration systems a flat filter is placed in a horizontal orientation, where air flows vertically through the filter. In other cases, filters can be positioned in a vertical orientation where the air flow is horizontal. In other instances filters are oriented in an angle with respect to the direction of gravity. The latter can be the case for any number of reasons. For example, the air flow direction required by the system may be at such an angle, or the filtration system may be mobile or portable and be required to operate as it is moved. Air filters in vehicles, vessels and aircraft may be such an example.

Figure 7B:
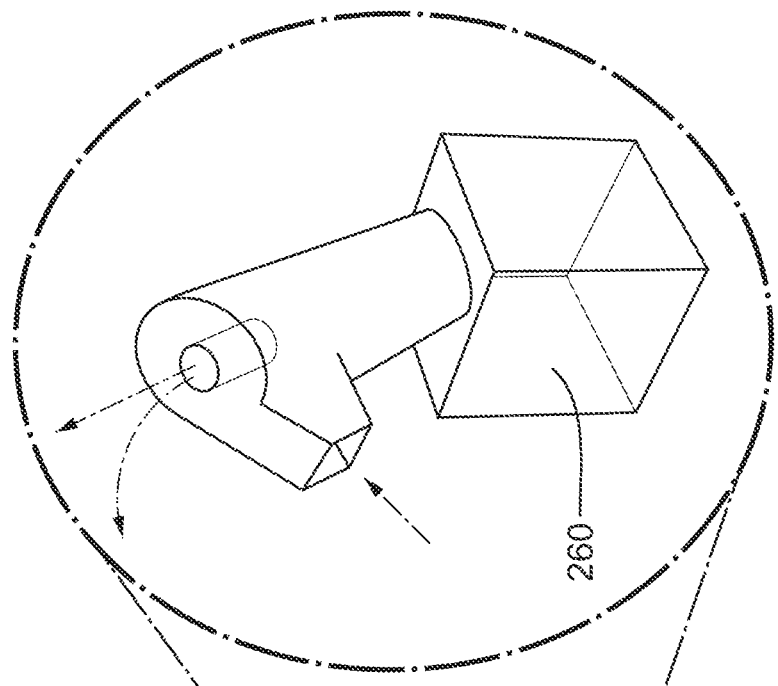
FIGS. 7A and 7B are filters in a V-bank configuration (7A) and a tilted receptacle element (7B) that can be used in such a configuration, constructed and operative according to some embodiments of the present disclosure.
Figure 7A:
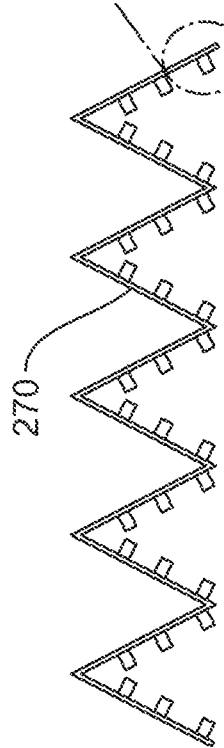

Yet in other cases, multiple filters are combined in a so-called V-bank or zig-zag configuration 270, shown in FIG. 7A. The orientation relative to gravity can have an influence on the performance of cyclonic separators as gravity helps draw the separated particles into the receptacle 260 and keep them in the receptacle 260. However, the receptacle form can be designed to address operation in non-vertical orientation. In a non-limiting example, illustrated in FIG. 7B, the receptacle 260 (and/or the cavity) can be set at an angle relative to the sheet array plane, so that when the filter is orientated at an angle, the receptacles 260 become substantially vertical. For example, the receptacle 260 can be oriented at an angle of about 5°, about 10°, about 15°, about 20°, about 25°, about 30°, about 35°, about 40°, about 45°, including values and subranges therebetween, with respect to the sheet array plane.

Figure 8B:
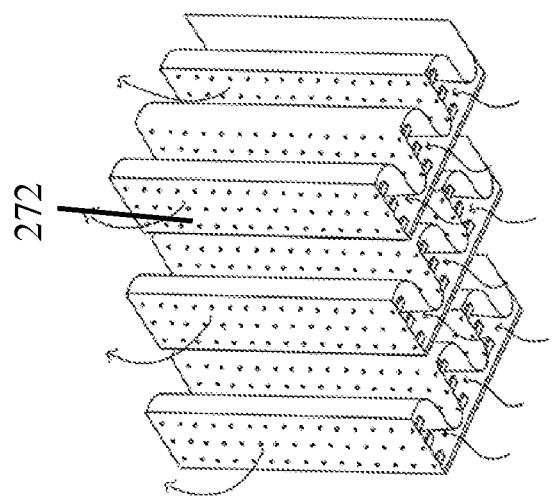
FIGS. 8A and 8B are multi-array stack filters where the arrays are not coplanar with the filter itself.
Figure 8A:
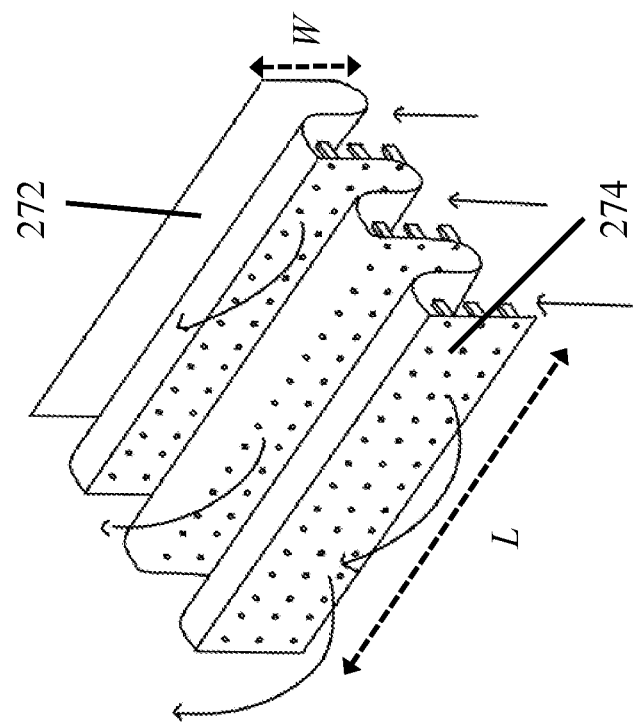

In another embodiment, shown in FIGS. 8A and 8B, a generally flat or planar filter comprises connected array segments, where each segment is at an angle relative to the filter plane. FIG. 8A shows a side view of a segmented array filter 272 where each segment 274 is at a substantially 90-degree angle relative to the filter plane. The array segments essentially form a parallel stack with appropriate barriers to prevent air from flowing between the individual arrays segments. Since the axes of the cyclone elements 240 are substantially perpendicular to the array surface in each segment 274, they are substantially parallel to, or in-plane with, the filter plane. In this example when the filter is positioned substantially vertically, the cyclone elements 240 and the receptacles 260 are in the conventional orientation, namely the receptacle 260 is positioned underneath the cyclone element 240. To allow the required air flow through the cyclone elements 240, connecting surfaces or partitions can be attached to the segments as shown schematically in FIG. 8A, preventing air flow across the filter other than through the cyclonic elements inlets.

In the configuration of parallel array stack at substantially 90-degrees to the filter, the width of the array in large part determines the thickness of the filter, which at least has to be as thick as the width W. The length of the array, L, on the other hand, can be substantially larger as long as it does not exceed the length of the entire filter. There are several common standards for filter thickness and in some embodiments, the array segments can be designed to meet similar standards. Among the common standards for low performance filters, a thickness T (FIG. 1A) of 10 mm and 25 mm (or 1 inch) are common. Higher performance filters are commonly available at thicknesses T of approximately 50 mm (2"), 100 mm (4") and 200 mm (8"). The array segment itself may need to be slightly less than the target filter thickness, to allow for the inter-segment connecting barriers or the frame itself. In some embodiments, the width of the array disclosed herein can be configured so as to allow filters with thickness ranging from about 10 mm to about 200 mm, from about 20 mm to about 150 mm, from about 25 mm to about 150 mm, from about 50 mm to about 125 mm, from about 50 mm to about 100 mm, about 75 mm, including values and subranges therebetween.

In this stack configuration, the stacking density is limited by the height of the cyclonic elements 240, including the receptacle 260. This presents a partial tradeoff between the overall number of elements 240, which can determine the total air flow through the filter, and the depth of the receptacles 260, which can affect the filter operating life as explained above.

FIG. 8B shows a side view of a segmented array filter 272 where each segment is approximately at a 45-degree angle relative to the filter plane. Any other angle including angles in the range from about 0 degree to about 90 degrees, from about 10 degrees to about 75 degrees, from about 20 degrees to about 60 degrees, from about 25 degree to about 60 degree, from about 30 degrees to about 45 degrees, can be realized using this approach.

Figure 9:
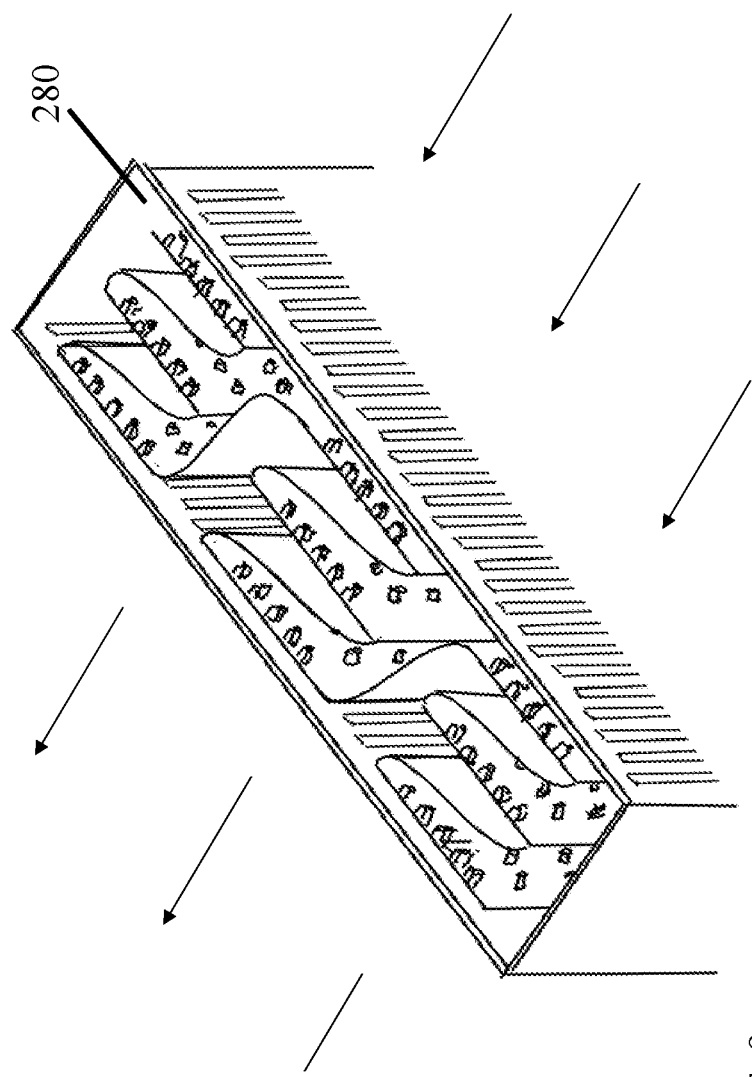
FIG. 9 is a section of a filter comprising a plurality of stacks where each stack has three layers, each an array of cyclonic elements, and the multiple stacks are coplanar with each other, constructed and operative according to some embodiments of the present disclosure.

A variation of the stack configuration can be also utilized when the intended filter orientation is horizontal and therefore substantially parallel to the array sheets. This configuration is shown in FIG. 9. The filter comprises multiple stacks where each stack comprises several parallel array segments, and the multiple stacks are placed side by side to form the entire filter 280. In FIG. 9 each stack is shown to comprise three parallel array sections. In some embodiments, the stacked may comprise more or less array sections (e.g., two, one, four, five, six, etc., array sections). The advantage of this configuration over the simple in-plane configuration is the ability to increase the aggregate number of cyclonic elements in a filter of given size, while still allowing the filter orientation to be horizontal. In this embodiment, barriers are configured such that air enters the filter vertically between the stacks, then guided to flow horizontally underneath each array in the stack, from where it proceeds to flow into the cyclonic inlets, through the cavities and the outlets, above each array and finally to the other side of the stack and up between the neighboring stacks.

The cyclonic element arrays can be made of any suitable material including plastics, metal, ceramics, glass, paper, fiber, composites and any other material that can be molded, shaped, stamped, machined, etched, carved, printed or otherwise formed into the required structure, including additive manufacturing such as 3-dimensional printing.

In some embodiments the manufacture of a monolithic array is achieved in part by attaching a number of layers that are formed separately and when attached in the correct manner, form the required cavities and inlets. In one embodiment the layers are made of a plastic or polymer, such as, but not limited to, polyethylene, polypropylene, polystyrene, polycarbonate, PVC, PTFE or any other suitable plastic. Each layer can be formed using plastic manufacturing techniques including but not limited to injection molding, thermoforming or vacuum forming. Different layers can be formed using different processes. For example one layer can be made with vacuum forming and attached to another layer made with injection molding. Different layers may be made of different materials and can be attached using adhesives, welding or simply a mechanical attachment that is secured by mating features in adjacent layers.

Arrays can be mass produced in one or more standardized sizes, and a variety of filter sizes can be made from the mass produced array modules either by attaching a plurality of smaller sections or by cutting a larger sheet into smaller pieces that match the design of the filter required.

The dimensions and precise structure of the individual cyclonic elements can be modified to meet the requirements of different applications. Smaller diameter cavities will generally have better ability to capture finer particles.

EXAMPLE EXPERIMENTAL EMBODIMENTS

Figure 10B:
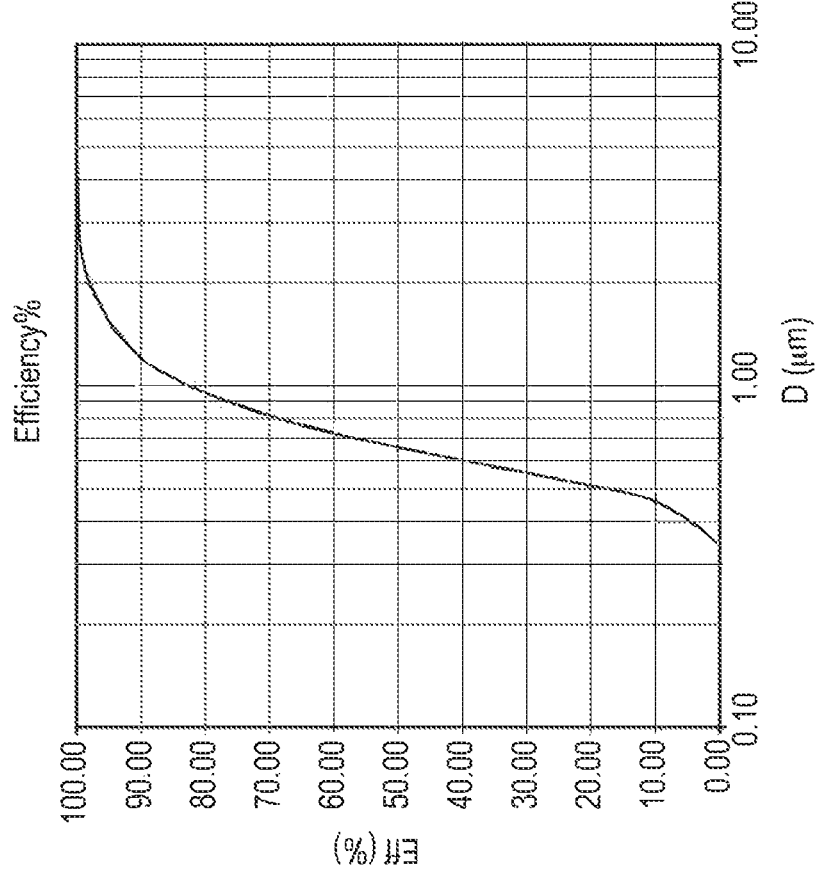
FIGS. 10A-B and FIGS. 11A-B show example experimental results of particle capture efficiency of the air filter disclosed herein versus particle size, according to some embodiments of the present disclosure.
Figure 10A:
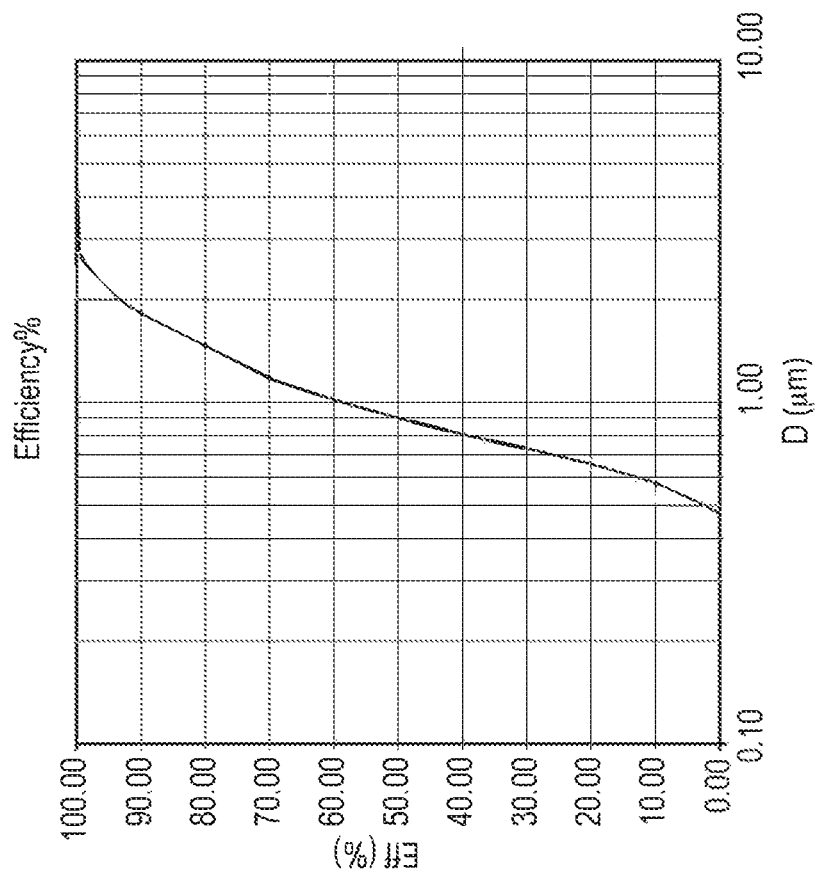
Figure 11B:
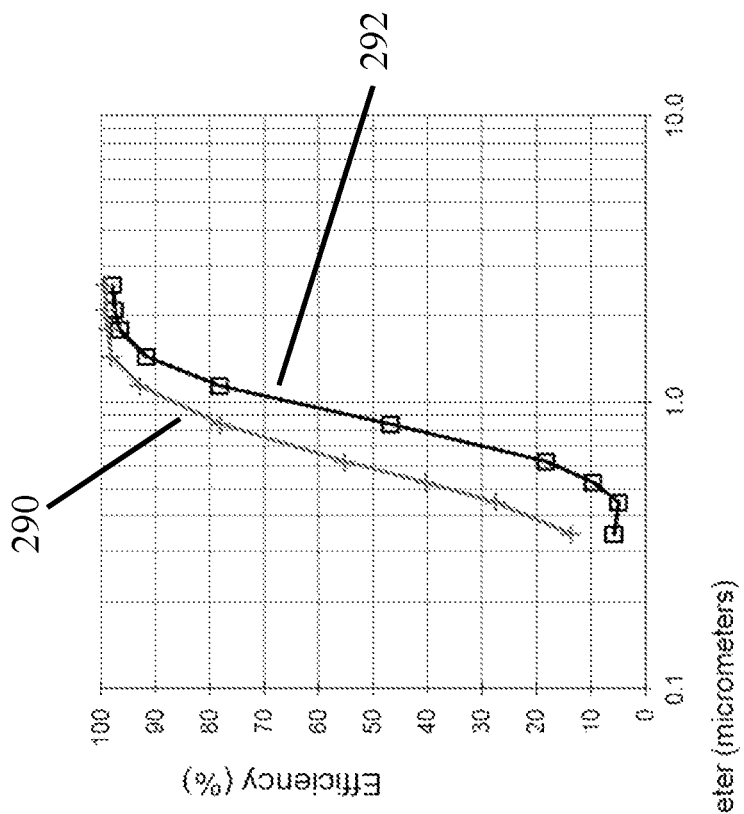
Figure 11A:
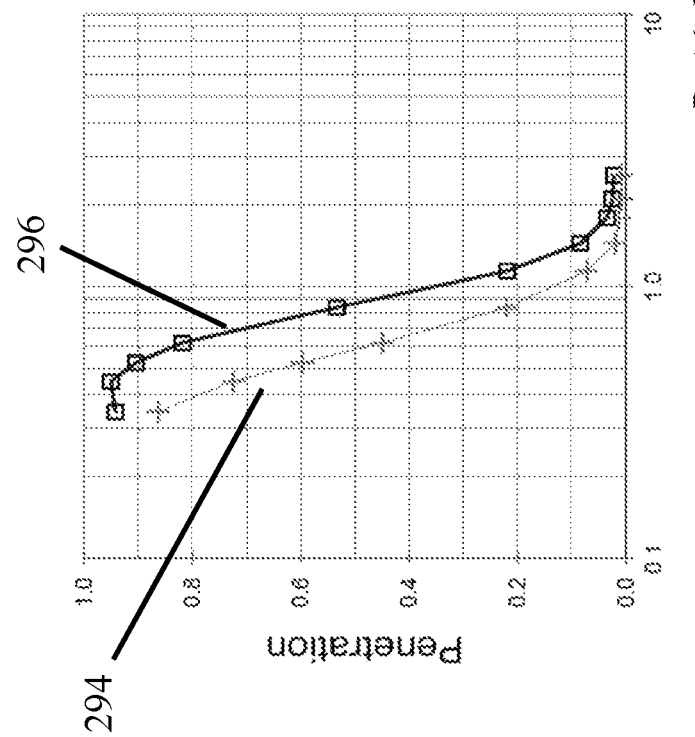

FIGS. 10A-B and FIGS. 11A-11B provide example experimental results of particle capture efficiency of the air filter disclosed herein versus particle size, according to some embodiments of the present disclosure. The results of FIGS. 10A-B were obtained by using a custom testing set-up comprising TSI Incorporated's TSI Component Filter Test System Model 3150, TSI Flowmeter Model 4045, a potassium-chloride aerosol source (which may include an atomizer and a dryer) and TSI Model 3330 Optical Particle Sizer. FIGS. 10A and 10B illustrate capture efficiencies of the filter disclosed herein for different particle sizes (average particle diameters) when the flow rate corresponds to about 500 Pascals and 250 Pascals, respectively. These results are consistent with the experimental results depicted in FIG. 11B (for flow rate corresponding to about 500 Pascals, 292, and flow rate corresponding to about 250 Pascals, 290), which show the capture efficiencies as a function of average particle size (e.g., diameter) as measured by a large scale testing performed by American Society of Heating, Refrigeration, and Air Conditioning Engineers (ASHRAE) 45.1 standardized testing of filters and particle resistance. FIG. 11A shows the particle penetration rate for different particle sizes, illustrating that the disclosed filter blocks the passages of substantially all particles with average size (e.g., diameter) exceeding about 2 µm, both when the flow rate corresponds to about 500 Pascals, 296, and 250 Pascals, 294.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be an example and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure. Some embodiments may be distinguishable from the prior art for specifically lacking one or more features/elements/functionality (i.e., claims directed to such embodiments may include negative limitations).

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Any and all references to publications or other documents, including but not limited to, patents, patent applications, articles, webpages, books, etc., presented anywhere in the present application, are herein incorporated by reference in their entirety. Moreover, all definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or"

should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A replacement air filter for a filtration system, comprising:
a housing; and
a plurality of arrays organized in a parallel arrangement and supported by or contained within the housing, wherein:
each array includes a plurality of cyclone elements;
the housing includes:
a first side configured to receive a first airflow,
a second side configured to expel the first airflow,
a frame;
the arrays being enclosed by the housing;
each cyclonic element comprising a hollow cylindrically or conically-symmetric cavity having a tangential airflow inlet and an axial airflow outlet,
the cyclonic elements in each array being attached to each other via a sheet so as to form a common surface such that, the common surface includes or is in airflow communication with the airflow outlets of the cyclonic elements, and is in airflow communication with the second side of the housing,
the received airflow flows among the plurality of cyclonic elements from a respective airflow inlet, through a respective cavity, to a respective airflow outlet such that, the received airflow entering the housing via the first side is filtered by the cyclone elements of each array, and is expelled via the second side of the housing;
and
the filter housing includes:
a thickness T of between 10 mm and 200 mm, so as to correspond to a thickness of standard, fiber medium-based filter; and
an area of between 900-8000 $cm^2$, so as to correspond to a standard, fiber-based medium filter;
wherein a height of each of the plurality of cyclonic elements is between 5 mm and 15 mm.

2. The filter of claim 1, wherein the cyclonic elements are configured to remove at least a portion of particles suspended in air flowing through the cyclonic elements.

3. The filter of claim 1, wherein the plurality of arrays are further configured with a plurality of receptacles configured to receive and hold particles separated from air flowing through the cyclonic elements.

4. The filter of claim 3, wherein a depth h of each receptacle is between about 2-50 mm.

5. The filter of claim 3, wherein a depth h of each receptacle is between about 3-20 mm.

6. The filter of claim 1, wherein the housing is rectangular.

7. The filter of claim 1, wherein an inner diameter d of the hollow cavity at its widest point is less than about 10 mm.

8. The filter of claim 1, wherein an inner diameter d of the hollow cavity at its widest point is less than about 5 mm.

9. The filter of claim 1, wherein an inner diameter d of the hollow cavity at its widest point is less than about 2 mm.

10. The filter of claim 1, further comprising a plurality of parallel planar segments each oriented perpendicular or approximately perpendicular to a plane of the filter.

11. The filter of claim 1, further comprising a plurality of parallel planar segments each oriented at an angle greater than about 30 degrees relative to a plane of the filter.

12. The filter of claim 1, wherein the arrays are configured in one or more layers, each layer comprising an integral plastic monolith.

13. A replacement air filter for a filtration system, comprising:
a housing; and
an array of a plurality of cyclonic elements,
wherein:
the housing includes:
a first side configured to receive a first airflow,
a second side configured to expel the first airflow, a frame;
the array being enclosed by the housing;
each cyclonic element comprising a hollow cylindrically or conically-symmetric cavity having a tangential airflow inlet and an axial airflow outlet,
the cyclonic elements being attached to each other via a sheet so as to form a common surface such that, the common surface includes or is in airflow communication with the airflow outlets of the cyclonic elements, and is in airflow communication with the second side of the housing,
the received airflow flows among the plurality of cyclonic elements from a respective airflow inlet, through a respective cavity, to a respective airflow outlet such that, the received airflow entering the housing via the first side is filtered by the cyclone elements and is expelled via the second side of the housing;
and
the filter housing includes:
a thickness T of between 10 mm and 200 mm, so as to correspond to a thickness of standard, fiber medium-based filter; and
an area of between 900-8000 $cm^2$, so as to correspond to a standard, fiber-based medium filter; wherein a height of each of the plurality of cyclonic elements is between 5 mm and 15 mm.

14. A replacement air filter for a filtration system, comprising:
a housing;
an array of a plurality of cyclonic elements, and
at least one receptacle corresponding to the plurality of cyclonic element,
wherein:
the housing includes:
a first side configured to receive a first airflow,
a second side configured to expel the first airflow,
a frame;
the array being enclosed by the housing;
each cyclonic element comprising a hollow cylindrically or conically-symmetric cavity having a tangential airflow inlet and an axial airflow outlet,
the cyclonic elements being attached to each other via a sheet so as to form a common surface such that, the common surface includes or is in airflow communication with the airflow outlets of the cyclonic elements, and is in airflow communication with the second side of the housing,
the received airflow flows among the plurality of cyclonic elements from a respective airflow inlet, through a respective cavity, to a respective airflow outlet such that, the received airflow entering the housing via the first side is filtered by the cyclone elements and is expelled via the second side of the housing;
the filter housing includes:
a thickness T of between 10 mm and 200 mm, so as to correspond to a thickness of standard, fiber medium-based filter; and
an area of between 900-8000 $cm^2$, so as to correspond to a standard, fiber-based medium filter;
the at least one receptacle is sized so as to receive and hold particles separated from air flowing through the cyclonic elements so as to extend the life of the filter; wherein a height of each of the plurality of cyclonic elements is between 5 mm and 15 mm.

15. The filter of claim 14, wherein the at least one receptacle is sized so as to receive and hold particles separated from air flowing through the cyclonic elements for the operational lifetime of the filter.

16. The filter of claim 15, wherein the operational lifetime of the replacement filter is 10 years.

17. The filter of claim 14, wherein the at least one receptacle includes a depth of between 5 mm to 18 mm.

18. The filter of claim 14, wherein the at least one receptacle includes a depth of between 7 mm to 16 mm.

19. The filter of claim 14, wherein the at least one receptacle includes a depth of between 9 mm to 14 mm.

* * * * *